United States Patent
Dolazza et al.

[11] Patent Number: 5,935,070
[45] Date of Patent: Aug. 10, 1999

[54] METHOD AND APPARATUS FOR DELAYING ULTRASOUND SIGNALS

[75] Inventors: Enrico Dolazza, Boston; Louis R. Poulo, Andover, both of Mass.

[73] Assignee: Analogic Corporation, Peabody, Mass.

[21] Appl. No.: 09/001,861

[22] Filed: Dec. 31, 1997

[51] Int. Cl.$^6$ .......................................................... A61B 8/00

[52] U.S. Cl. ........................... 600/443; 600/444; 600/447

[58] Field of Search ..................................... 600/443, 437, 600/447, 444; 73/602; 367/138

[56] References Cited

U.S. PATENT DOCUMENTS

| | | | |
|---|---|---|---|
| 5,217,017 | 6/1993 | Matsushima | 600/447 |
| 5,345,426 | 9/1994 | Lipschutz | 600/447 |
| 5,608,690 | 3/1997 | Hossack et al. | 367/138 |
| 5,685,308 | 11/1997 | Wright et al. | 600/443 |

OTHER PUBLICATIONS

Dolazza, E., The Bell–Spine, a Digital Filtering/Interpolation Algorithm, Proceedings of SPIE–The International Society for Optical Engineering, vol. 1092, Jan. 31 Feb. 3, 1989, pp. 568–583.

*Primary Examiner*—Marvin M. Lateef
*Assistant Examiner*—Ali M. Imam
*Attorney, Agent, or Firm*—Lappin & Kusmer LLP

[57] ABSTRACT

An ultrasound beamformer that processes the signals of an array transducer includes a plurality of processing channels, one for each element of the active transducer array. Each channel includes a digitizing element for converting the received signal into digital samples and a delay element for delaying the digitized signal. The delays are chosen so that when the signals from the individual channels are combined, a beam forms in a particular direction. The invention implements sub-sampling period delays in the individual channels with low-complexity digital filters having superior delay characteristics with respect to frequency, but having undesirable attenuation characteristics with respect to frequency. The invention corrects for the undesirable attenuation characteristics via a single digital filter after the signals from the individual channels have been combined.

10 Claims, 9 Drawing Sheets

|  | b0 | b1 | b2 | b3 |
|---|---|---|---|---|
|  | 0 | 1 | 2 | 3 |
| 0 | 16 | 63 | 16 | 0 |
| 1 | 13 | 63 | 19 | -1 |
| 2 | 10 | 62 | 23 | -2 |
| 3 | 7 | 60 | 27 | -2 |
| 4 | 5 | 58 | 31 | -1 |
| COEFFICIENTS = 5 | 4 | 56 | 35 | -1 |
| 6 | 2 | 53 | 38 | -1 |
| 7 | 1 | 49 | 42 | 0 |
| 8 | 0 | 46 | 46 | 0 |
| 9 | 0 | 42 | 49 | 1 |
| 10 | -1 | 38 | 53 | 2 |
| 11 | -1 | 35 | 56 | 4 |
| 12 | -1 | 31 | 58 | 5 |
| 13 | -2 | 27 | 60 | 7 |
| 14 | -2 | 23 | 62 | 10 |
| 15 | -1 | 19 | 63 | 13 |

INDEX OF 0-15 CORRESPONDS TO FINE DELAY RANGE OF 0-15/16 SAMPLE TIME

*FIG. 3C*

|   | b0 | b1 | b2 | b3 |
|---|----|----|----|----|
|   | 0  | 1  | 2  | 3  |
| 0 | 19 | 63 | 19 | 0 |
| 1 | 16 | 63 | 23 | 0 |
| 2 | 13 | 62 | 26 | 0 |
| 3 | 11 | 60 | 30 | 0 |
| 4 | 9  | 59 | 33 | 0 |
| COEFFICIENTS = 5 | 7 | 56 | 37 | 1 |
| 6 | 5  | 54 | 41 | 1 |
| 7 | 4  | 51 | 44 | 2 |
| 8 | 3  | 48 | 48 | 3 |
| 9 | 2  | 44 | 51 | 4 |
| 10 | 1 | 41 | 54 | 5 |
| 11 | 1 | 37 | 56 | 7 |
| 12 | 0 | 33 | 59 | 9 |
| 13 | 0 | 30 | 60 | 11 |
| 14 | 0 | 26 | 62 | 13 |
| 15 | 0 | 23 | 63 | 16 |

INDEX OF 0-15 CORRESPONDS TO FINE DELAY RANGE OF 0-15/16 SAMPLE TIME

*FIG. 4C*

|  | b0 | b1 | b2 | b3 |
|---|---|---|---|---|
|  | 0 | 1 | 2 | 3 |
| 0 | 24 | 63 | 24 | 0 |
| 1 | 21 | 63 | 27 | 1 |
| 2 | 18 | 62 | 30 | 1 |
| 3 | 15 | 61 | 34 | 1 |
| 4 | 13 | 59 | 37 | 2 |
| COEFFICIENTS = 5 | 11 | 57 | 40 | 3 |
| 6 | 9 | 55 | 43 | 4 |
| 7 | 7 | 52 | 47 | 5 |
| 8 | 6 | 50 | 50 | 6 |
| 9 | 5 | 47 | 52 | 7 |
| 10 | 4 | 43 | 55 | 9 |
| 11 | 3 | 40 | 57 | 11 |
| 12 | 2 | 37 | 59 | 13 |
| 13 | 1 | 34 | 61 | 15 |
| 14 | 1 | 30 | 62 | 18 |
| 15 | 1 | 27 | 63 | 21 |

INDEX OF 0-15 CORRESPONDS TO FINE DELAY RANGE OF 0-15/16 SAMPLE TIME

*FIG. 5C*

METHOD AND APPARATUS FOR DELAYING ULTRASOUND SIGNALS

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

FIELD OF THE INVENTION

The present invention relates to ultrasound imaging systems which utilize phased array beam steering and focusing, and more particularly, to ultrasound imaging systems which utilize digital filters to implement delays in each of a plurality of ultrasound signal paths to affect phased array beam steering and focusing.

BACKGROUND OF THE INVENTION

In a phased array ultrasound imaging system, the ultrasound transducer includes an array of transducer elements. To support this array of transducer elements, the system includes a plurality of parallel channels, wherein each channel includes a transmitter and a receiver connected to one of the transducer elements in the array. Each transmitter outputs an ultrasound pulse through a transducer element into an object to be imaged, typically a human body. The transmitted ultrasound energy is steered and focused by applying appropriate delays to the pulses transmitted by each element in the array so that the transmitted energy arrives at a desired point in-phase, thus the energy adds constructively at that point. This causes a portion of the pulse to be reflected back to the transducer array by various structures and tissues in the body. As the pulse of ultrasound energy passes through the object to be imaged, a continuous reflection signal returns to the transducer array. The portions of the reflected signal received earliest by the transducer array are representative of those portions of the object closest to the transducer array. In general, the amount of elapsed time from when the pulse is transmitted until the signal is received by the transducer is representative of the distance from the transducer.

Steering and focusing of the received ultrasound energy is affected in similar manner. In a receive beamformer, the signal received from each of the transducers is processed and delayed, and then the signals from all of the transducer channels are summed in a signal summation element. The delay for each element is selected such that the reflected energy received by each transducer from the desired point is input into the summing element in phase (at the same time), thus creating a received beam that is focused at the desired point. The delays may be varied dynamically so that the transmitted beam can be scanned over a region of the body, and the signals generated by the beamformer can be processed to produce an image of the region.

Ideally, the delay means will not affect the signal in any way other than to delay it. The attenuation and the phase of the frequency components of the signal being delayed should not vary with the amount of delay selected; otherwise, the signal summation of the several channels will be unevenly weighted and will not produce the desired results. Also, the preservation of the signal should remain constant over a relatively broad frequency range so that shorter, wide-band ultrasound transmission pulses may be used.

In many prior art systems, the ultrasound signals remain in an analogue state until after signal summing element. In such systems, the delay means are usually limited to implementations such as fixed lengths of transmission line and all pass, constant group delay filters.

In other prior art systems, the ultrasound signals are digitized prior to being delayed and summed. In such systems, the means for creating the delays are necessarily digital. A common method of delaying the digitized ultrasound signal is to pass the digital samples through a series of hardware registers which are clocked at the sampling frequency $f_s$. For delays equal to an integer number of digitization intervals, each digital sample may be stored in a digital data storage device such as a Random Access Memory (hereinafter referred to as RAM); then the digital samples to be summed are properly aligned when extracted from the RAM. With either the hardware register or the digital storage device delay methods, the amount of signal delay is limited to an integer number of sampling intervals $\tau$, where $\tau$ is typically equal to $\lambda/(4c)$, $\lambda$ is the wavelength of the transmitted signal and c is the velocity of propagation of the transmitted signal. However, for precise beam steering, a smaller amount of delay for each channel is often required (typically as small as $\lambda/[32c]$). Passing the digitized ultrasound signal through a digital filter can provide the desired sub-sample period delay, as long as the original signal has been properly sampled. A continuous, band-limited signal which has been properly sampled can be completely reconstructed in the continuous domain. For this reason, digital filters can exhibit group delays (or equivalently, time delays) on signals which are less than the sampling period. The coefficients of the digital filter can be dynamically modified so that a range of delays can be selected. A relatively high order digital filter with a corresponding large number of coefficients is necessary to achieve an amplitude and phase response with respect to frequency which is independent of the selected sub-sample period delay. Because of the large number of channels, (e.g., 64 to 128 typical), there is a practical need to simplify components within the channels. Lower order digital filters exist that preserve the phase of the signal frequency components of an amount independent of the sub-sample period delay, over a wide frequency range, but such filters attenuate the amplitude of the signals.

Accordingly, it is an object of this invention to provide an improved ultrasound signal delay means for processing received signals from an ultrasound transducer array.

It is another object of this invention to provide an improved ultrasound signal delay means for processing received signals from an ultrasound transducer array which applies an independent delay to each of a plurality of ultrasound signal channels.

It is yet another object of this invention to provide an improved ultrasound signal delay means for processing received signals from an ultrasound transducer array which applies an independent delay to each of a plurality of ultrasound signal channels, and each of the channel delay means incorporates a low order filter.

It is a further object of this invention to provide an improved ultrasound signal delay means for processing received signals from an ultrasound transducer array which applies an independent delay to each of a plurality of ultrasound signal channels, each of the channel delay means incorporates a low order filter, and any undesirable signal characteristics caused by the low order filters are compensated by a filter following the channel signal summation element.

SUMMARY OF THE INVENTION

The present invention is directed to a method and apparatus for delaying ultrasound signals which in one aspect comprises a plurality of signal processing channels with each channel receiving an ultrasound signal from an element of a transducer array. Each channel includes a digitizing unit which converts the ultrasound signal into a series of digital data elements at a fixed sample rate. Each channel further includes a delay unit for selectably delaying the series of digital data elements from the digitizing means by one of a plurality of time increments. The series of delayed digital data elements from each of the signal processing channels are received by a summation unit, and in-phase samples from each of the signal processing channels are summed to form a composite signal comprising a series of composite digital data elements. The invention also includes a correction unit which receives the series of composite digital data elements and corrects them for one or more distortions introduced by the delay means. In one embodiment of the invention, the delay unit further includes a coarse delay unit which delays the channel signal by an integer number of sample period intervals, and a fine delay unit that delays the channel signal by one of a plurality of sub-sample period intervals. In another embodiment of the invention, the fine delay unit includes a low order digital filter which preserves the phase characteristics of the channel signal and attenuates the amplitude of the channel signal by an amount independent of the sub-sample interval delay selected.

BRIEF DESCRIPTION OF THE DRAWINGS

The foregoing and other objects of this invention, the various features thereof, as well as the invention itself, may be more fully understood from the following description, when read together with the accompanying drawings in which:

FIG. 3C shows the coefficient to delay relationship of a first embodiment of a Bell-Spline filter;

FIG. 4C shows the coefficient to delay relationship of a second embodiment of a Bell-Spline filter;

DETAILED DESCRIPTION OF THE INVENTION

The present invention is directed to an ultrasound imaging system with an array transducer for producing images representing cross sections through the human body.

Figure 1A:
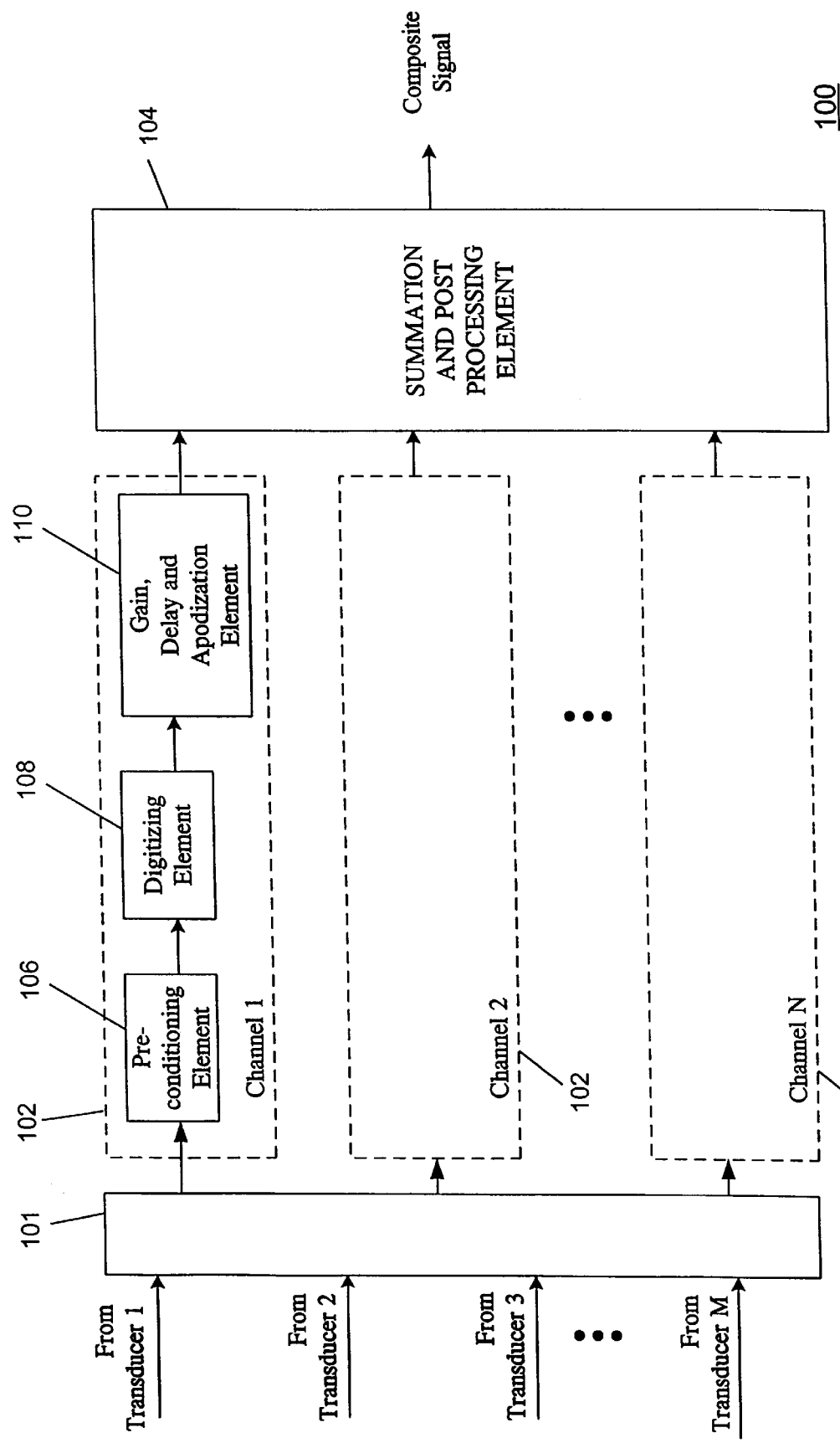
FIG. 1A shows a simplified block diagram of an ultrasound beamformer for use in an ultrasound imaging system.

FIG. 1A shows a simplified block diagram of one embodiment of an ultrasound beamformer 100 in accordance with the present invention. The ultrasound beamformer 100 includes a plurality of ultrasound transducers which form an active transducer array, a switching network 101, a plurality of signal processing elements 102, and a summation and post-processing element 104. Each signal processing element 102 includes a pre-conditioning element 106, a digitizing element 108, and a gain, delay and apodization element 110. The switching network 101 receives an ultrasound signal from each of the ultrasound transducers and selectively directs the signals to the signal processing elements. The switching network 101 allows the system to have fewer processing elements 102 than transducers, so that a set of processing elements 102 can sequentially process signals of transducers from multiple regions of the transducer array.

Figure 1B:
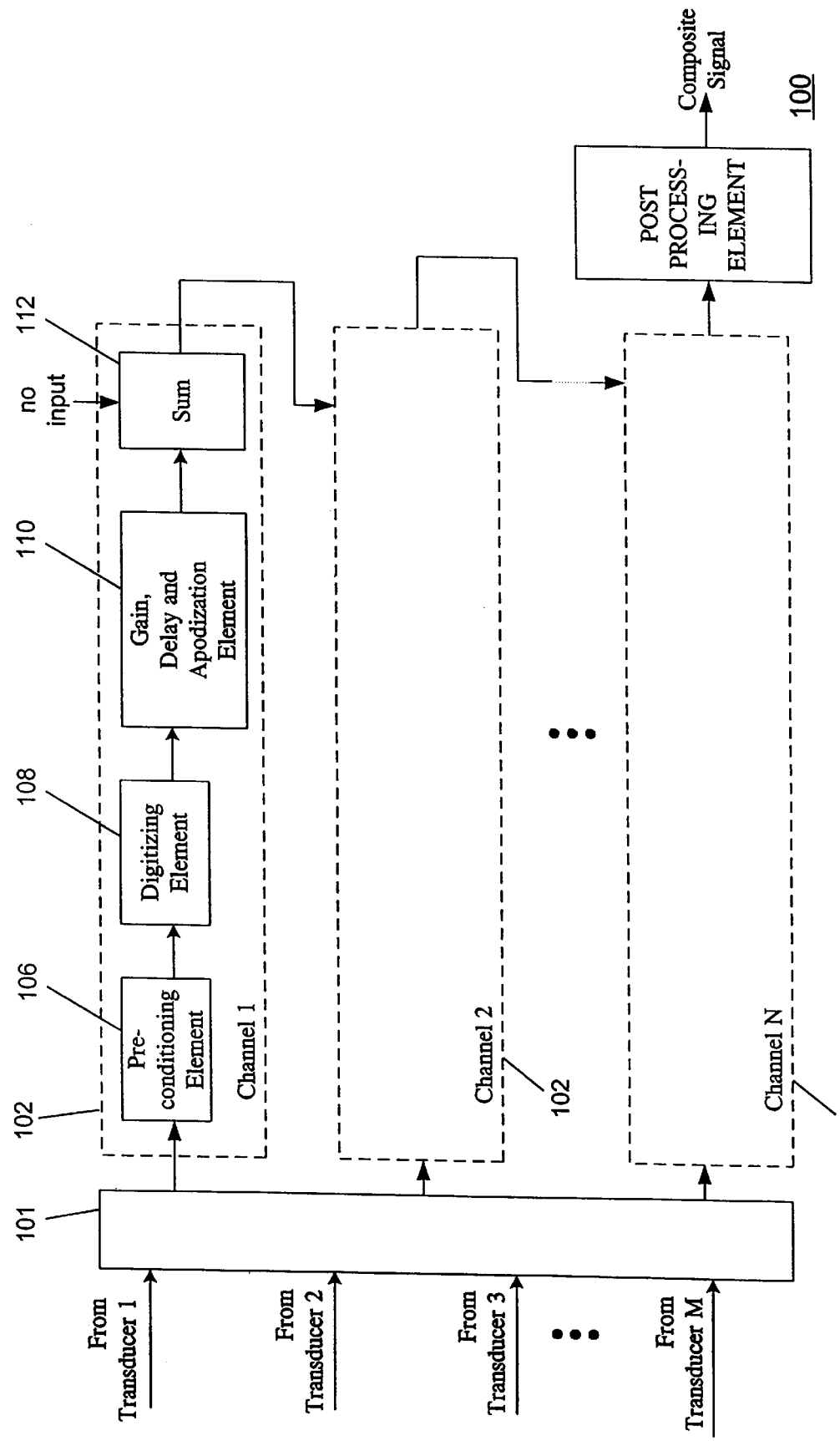
FIG. 1B shows a simplified block diagram of the ultrasound beamformer of FIG. 1A with a distributed summing function.

Each pre-conditioning element 106 receives an ultrasound signal from the switching network 101, and the gain, delay and apodization element 110 produces a processed signal to be combined with the processed signals from the other signal processing elements 102. The summation and post-processing element 104 receives the signals produced by the several signal processing elements 102. The summation and post-processing element 104 produces a composite signal as a function of the signals received from the signal processing elements 102. FIG. 1B shows another embodiment of an ultrasound beamformer 100 in accordance with the present invention. In the embodiment of FIG. 1B, the summation portion of the summation and post-processing element 104 from FIG. 1A is distributed among the signal processing elements as distributed summation elements 112. Each distributed summation element receives the sum output for the next previous distributed summation element 112 and adds to it the signal from its own channel. The resulting sum is provided as the sum output for the next distributed summation element.

The pre-conditioning element 106 receives the ultrasound signal from the ultrasound transducer in order to prepare the signal to be digitized by digitizing unit 108. The pre-conditioning unit can include elements that perform gain control and equalization functions, signal limiting functions and/or signal filtering functions to remove noise and other undesirable characteristics from the ultrasound signal.

The digitizing unit 108 receives the pre-conditioned ultrasound signal from the pre-conditioning element 106 and samples the pre-conditioned ultrasound signal at a sampling frequency $f_s$. To prevent aliasing, the sampling frequency $f_s$ must be at least twice the frequency bandwidth of the preconditioned ultrasound signal, and, if the A/D converter is not used as a mixer, twice the frequency of the highest frequency component of the preconditioned ultrasound signal. In one embodiment of the invention, the sampling frequency $f_s$ is chosen to be four times the frequency of the central frequency component of the pre-conditioned ultrasound signal. Each time the pre-conditioned ultrasound signal is sampled, the digitizing element 108 produces a digital data element representative of the amplitude of the pre-conditioned ultrasound signal at the instant in time that the sample occurred. The digitizing element 108 produces a series of digital data elements representative of the pre-conditioned ultrasound signal at a data rate equal to the sampling frequency $f_s$.

The gain, delay and apodization element 110 receives the series of digital data elements from the digitizing element 108. The gain portion of the gain, delay and apodization element 110 modifies the amplitude of the digitized ultrasound signal so that an apodization of the signals of the different channels can be obtained. An exemplary use of apodization is the reduction of the side lobes of the formed beam. The delay portion of the gain, delay and apodization element 110 time-shifts the digitized ultrasound signal.

Figure 2:
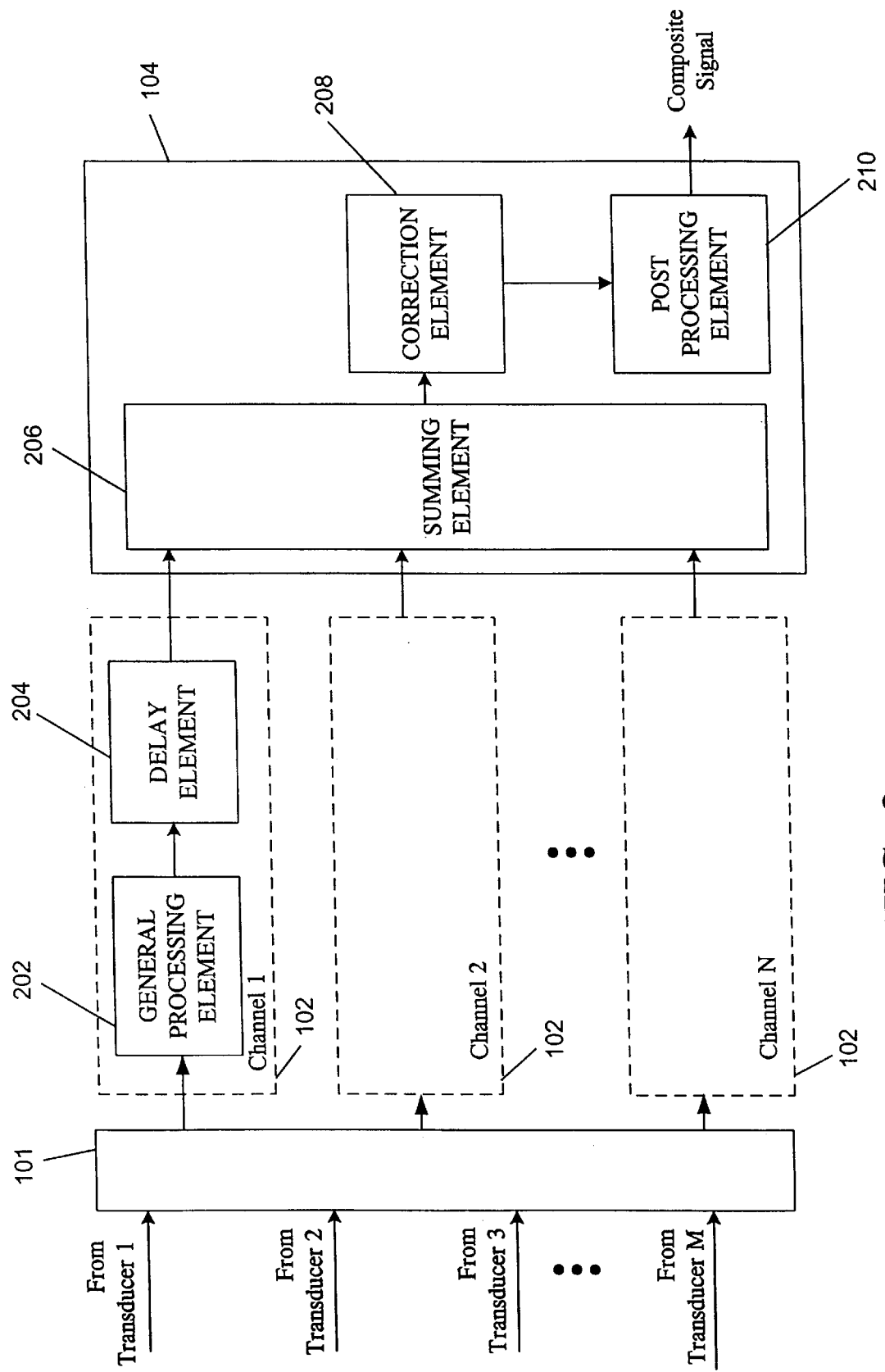
FIG. 2 shows an alternate view of the ultrasound beamformer shown in FIG. 1A.

FIG. 2 shows an alternate view of the ultrasound beamformer 100 shown in FIG. 1. FIG. 2 conceptually presents all of the elements of the signal processing element 102 as a general processing element 202 and a delay element 204. The summation and post-processing element 104 is conceptually presented as a summing element 206, a correction element 208 and a general post-processing element 210. As described herein for FIG. 1B, the parallel summing element 206 may, in other embodiments of the invention, be distributed among the signal processing elements 102. In general, the invention includes a delay element 204 having desirable delay characteristics with respect to frequency and relatively simple, low complexity architecture, that may result in other undesirable characteristics that are substantially independent of the amount of the delay selected. An example of such an undesirable characteristic is the attenuation of the signal amplitude as a function of the signal frequency. The undesirable characteristics, if any, are mitigated or even completely corrected by the correction element 208 after summation. The low complexity of the delay element 204 is important because any component included in the signal processing element 102 must be duplicated a relatively large number of times (i.e., once for each channel). The correction element 208 can be more complex, since it is only instantiated once, after the signals from the signal processing elements 102 are combined via the summing element 206 (or, in other embodiments, via summing elements distributed among the signal processing elements).

Figure 3A:
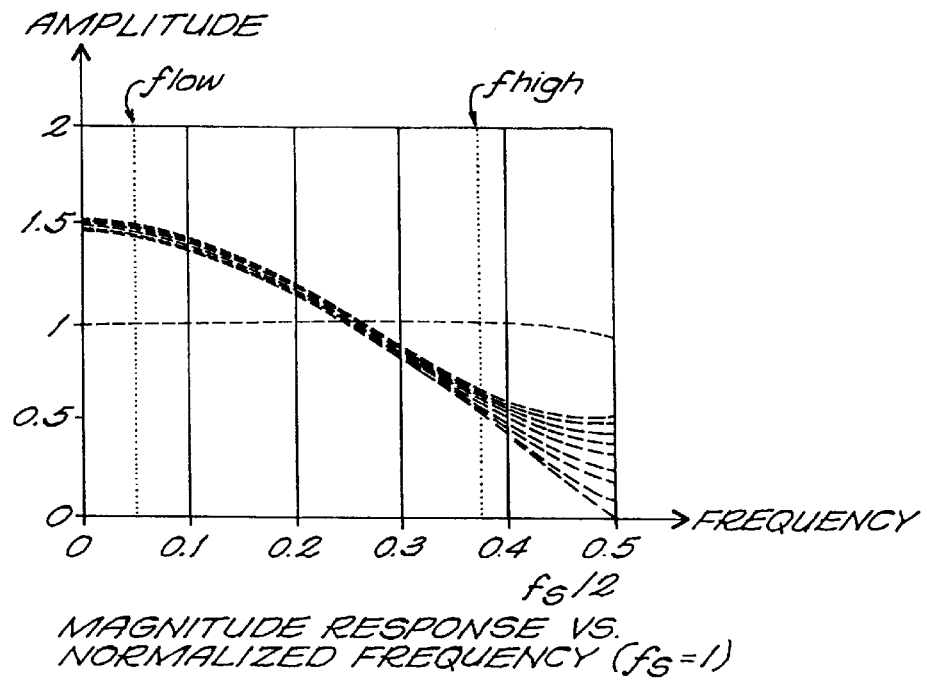
FIG. 3A shows the attenuation verses frequency characteristics of a first embodiment of a Bell-Spline filter.
Figure 3B:
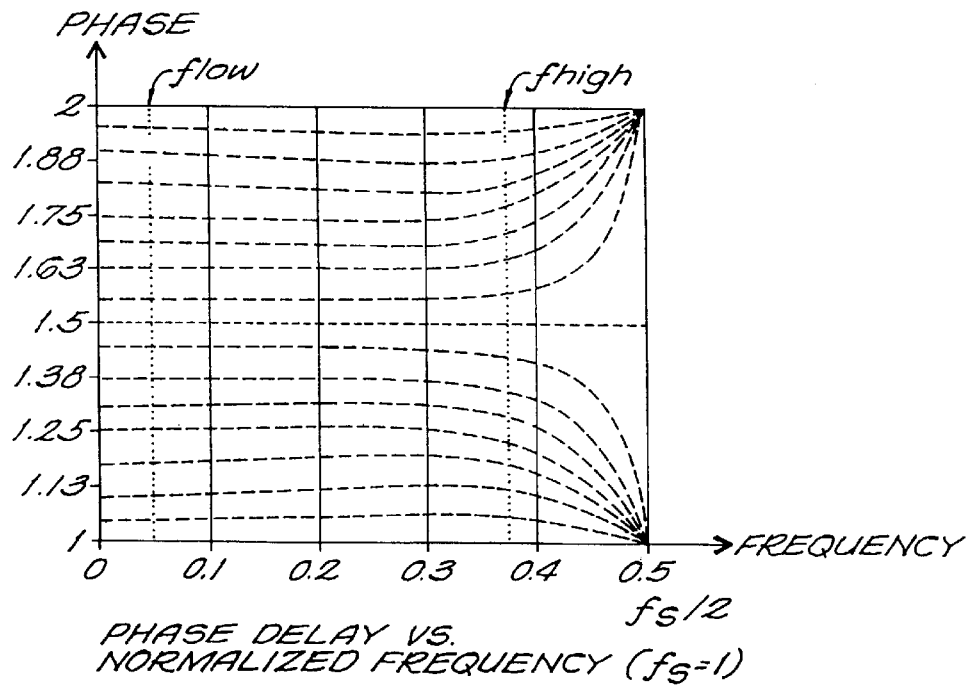
FIG. 3B shows the delay verses frequency characteristics of a first embodiment of a Bell-Spline filter.
Figure 4A:
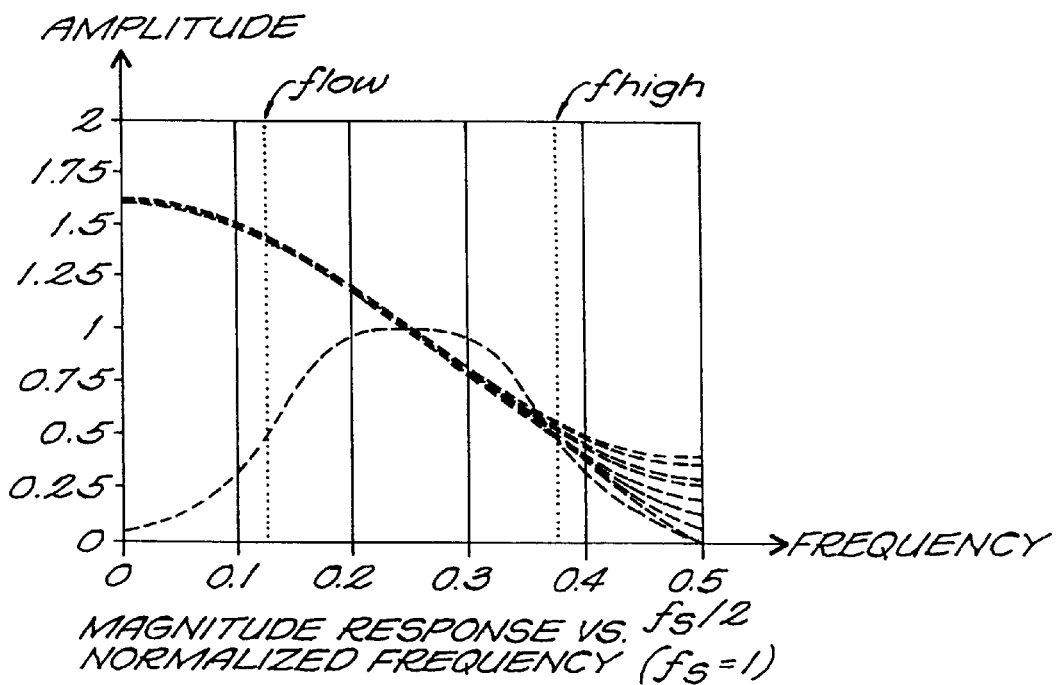
FIG. 4A shows the attenuation verses frequency characteristics of a second embodiment of a Bell-Spline filter.
Figure 4B:
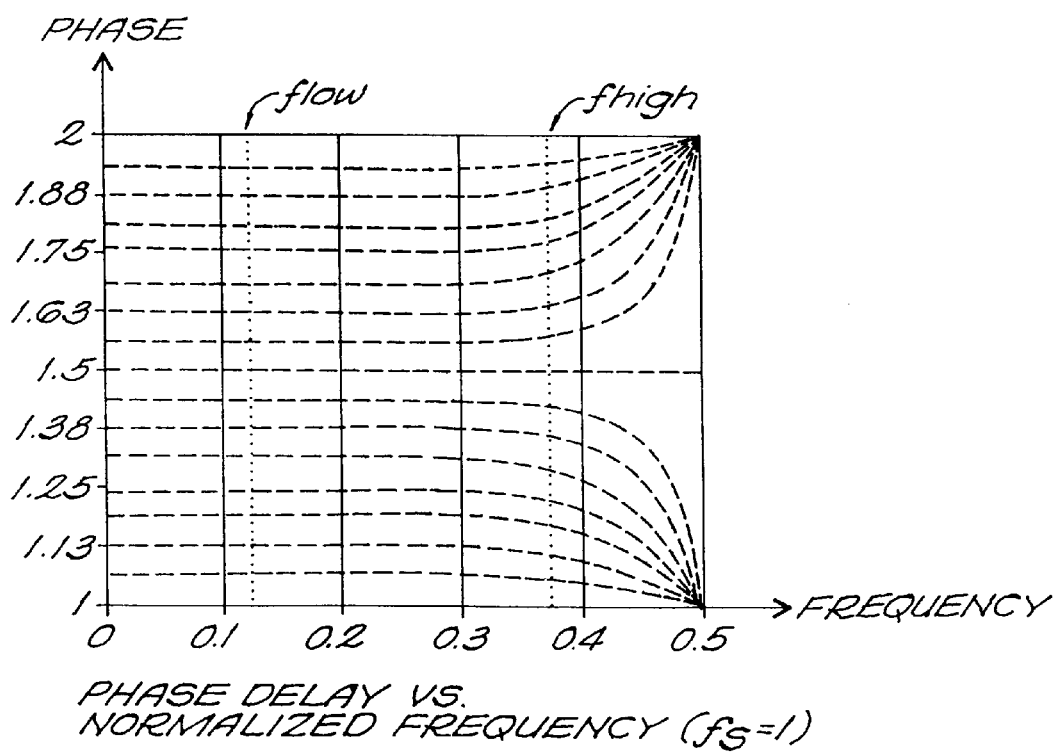
FIG. 4B shows the delay verses frequency characteristics of a second embodiment of a Bell-Spline filter.
Figure 5A:
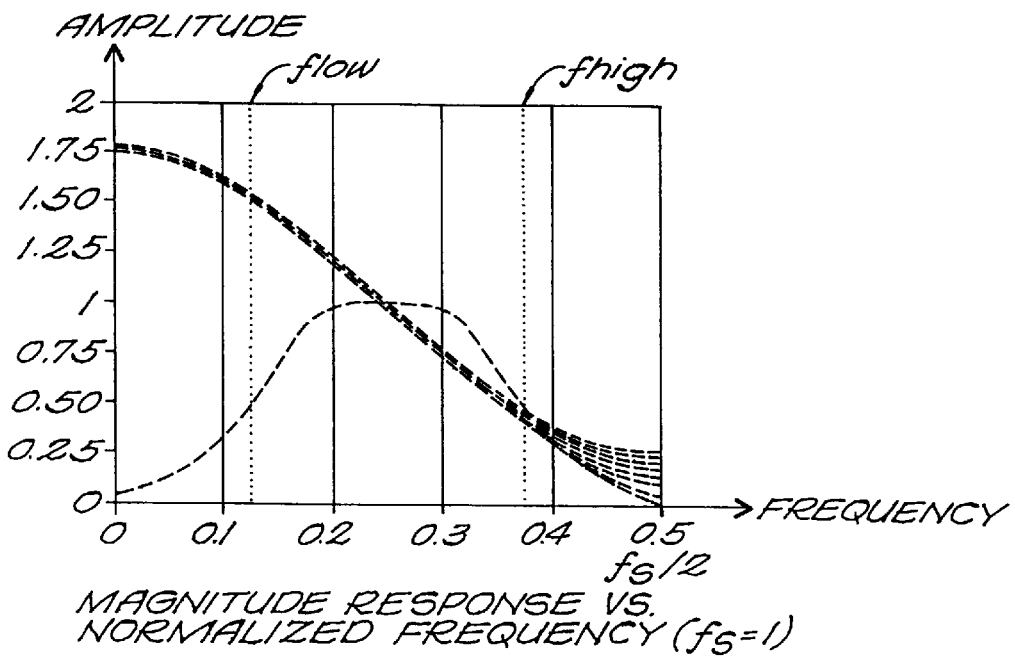
FIG. 5A shows the attenuation verses frequency characteristics of a third embodiment of a Bell-Spline filter.
Figure 5B:
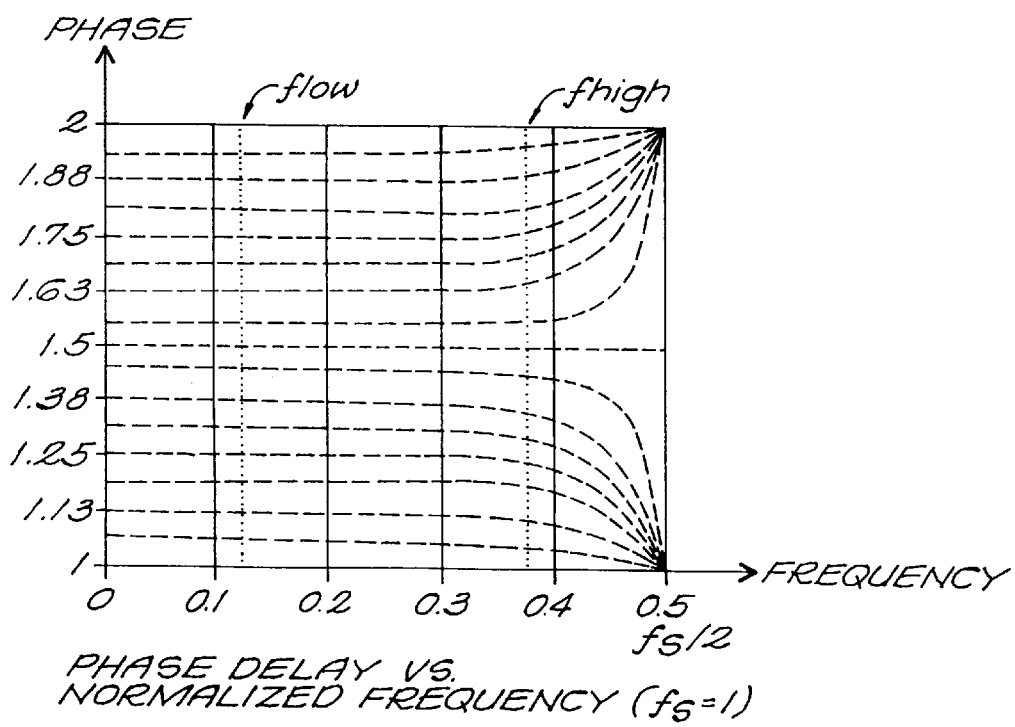
FIG. 5B shows the delay verses frequency characteristics of a third embodiment of a Bell-Spline filter; and, FIG. 5C shows the coefficient to delay relationship of a third embodiment of a Bell-Spline filter.

In one form of the invention, the delay element 204 is a digital Bell-Spline FIR filter having four coefficients. For more information regarding the Bell-Spline filter, see The Bell-Spline, a digital filtering/interpolation algorithm, by Enrico Dolazza, Proceedings of SPIE-The International Society for Optical Engineering, Vol 1092, Jan. 31–Feb. 3, 1989 (hereinafter referred to as "the Dolazza paper"). A Bell-Spline filter is generally characterized by a β value (a shape parameter) and a D value (a truncation parameter), as is more completely described in the Dolazza paper. FIGS. 3A, 4A and 5A show the magnitude response verses frequency, and FIGS. 3B, 4B and 5B show the delay response verses frequency of three typical four-coefficient Bell-Spline filters. In FIGS. 3, 4 and 5, the associated Bell-Spline filters have β values of 1.5, 2.0 and 4.0, respectively and D values of 1.22, 1.20 and 1.10, respectively. FIGS. 3C, 4C and 5C show the relationship between the filter's coefficient settings and amount of sub-sampling period delay generated by the filter. FIGS. 3A, 4A and 5A show the magnitude response verses frequency of the corresponding filter for the various coefficient settings. These graphs show that the signal attenuation as a function of the frequency is substantially independent of the filter delay. FIGS. 3B, 4B and 5B show the amount of delay applied to a signal passing through the filter as a function of the signal frequency. The horizontal frequency axis is normalized to the sampling frequency of the ultrasound signal, which in all three cases is four times the central frequency of the ultrasound signal. Thus the 0.5 point on the horizontal axis represents $f_s/2$. For broadband ultrasound signal processing, the frequency components of the signal exist in a frequency range centered on the central frequency and having a bandwidth approximately equal to the central frequency itself. In terms of normalized frequencies, this means that only the frequencies of interest are will between $0.1\ f_s$ and $0.4\ f_s$ when the signal is sampled at $f_s$, where $f_s$ is equal to four times the central frequency. All three filters provide 16 equal increments of the sub-sampling period delay, ranging from 0 to $^{15}/_{16}$ of a sample period, although those skilled in the art will recognize that other sets of delay increments, wherein the delay elements are not necessarily equal, may be used. The particular amount of delay through the filter is selected by setting the four coefficients to the corresponding values.

A common characteristic of the three Bell-Spline filters shown in FIGS. 3A, 4A and 5A (and of Bell-Spline filters in general) is a magnitude verses frequency response which is substantially independent of the amount of delay through the filter. For example, the 16 delays which are traced in FIG. 3B (signal delay verses frequency) are nearly collinear in FIG. 3A (magnitude verses frequency); only near the $f_s/2$ do the traces begin to diverge. Ideally, the magnitude response of the filter will be constant within the frequency range of interest, so that all signals received within that frequency range will be passed equally. However, the magnitude response for the three Bell-Spline filters, shown in FIGS. 3A, 4A and 5A, indicate variable attenuation characteristics verses frequency. Such frequency dependent signal shaping detrimentally effects subsequent signal processing of the ultrasound signals so that the resulting image is degraded.

The invention utilizes a correction element 208 to compensate for the frequency dependent effect of the delay element 204. It is well known that the magnitude verses frequency response of the cascade of two systems is the product of the individual magnitude responses of the systems. Therefore, if the magnitude response of the correction element 208 is chosen to be proportional to the mathematical inverse of the magnitude response of the delay element 204, the overall magnitude response of the two filters will be substantially constant. Since the correction element 208 is located after the summation element 206 in the signal processing chain and only needs to be instantiated once, the complexity of the correction element can be high relative to the complexity of the delay element without burdening the overall complexity of the system.

When analog restoration filters are cascaded to compensate for the attenuation of some frequency component of the signal as described herein, the resulting signal-to-noise ratio generally decreases. This is because the restoration filter adds to the attenuated input signal and to its attenuated noise, the white noise of the filter itself. When digital filters are cascaded, the signal-to-noise level remains constant because while the sampled signal and its associated noise are attenuated together, the only source of additional noise is quantization noise, which can be arbitrarily reduced by increasing the number of bits into which the signal is digitally encoded. If sufficient dynamic range is designed into the system so that no loss of information occurs when the signal is attenuated, no further loss of information is caused by the digital filter. The invention provides a sufficient dynamic range margin throughout the digital processing chain to ensure that no loss of information takes place when the signal is attenuated, thereby eliminating additional noise contribution and maintaining the signal-to-noise ratio as the delay element 204 and the correction element 208 attenuate the digitized signal.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. An apparatus for delaying and combining ultrasound signals, comprising:
   A. a plurality of signal processing channels, each channel receiving one of a plurality of ultrasound signals from an element of a transducer array and each channel including:
      i. a digitizer constructed and arranged so as to convert said ultrasound signal into a series of digital data elements at a digital sample rate, said digital data elements having a sample period corresponding to said digital sample rate;
      ii. a signal delay constructed and arranged so as to selectably delay said series of digital data elements by one of a plurality of time increments to produce a series of delayed digital data elements, said delay having a frequency dependent attenuating characteristic;
   wherein said frequency dependent attenuation characteristic is substantially identical for all of said signal processing channels;
   B. a signal summer constructed and arranged so as to sum said series of delayed digital data elements from said plurality of processing channels, wherein contemporaneous samples from said delay means of each of said processing channels are summed to form a composite signal comprising a series of composite digital data elements;
   C. a signal converter constructed and arranged so as to correct said composite signal for one or more distortions introduced by said delay means, so as to produce a corrected composite signal, said corrected composite signal having an amplitude.

2. An apparatus according to claim 1, wherein said signal delay includes an input, an output, and a delay characteristic from said input to said output, said delay characteristic being a function of a plurality of dynamically selectable control coefficients defining a plurality of delays, wherein said attenuation characteristic of said signal delay is substantially identical for all of said plurality of signal processing channels.

3. An apparatus according to claim 2, wherein said signal delay includes a multiple order digital filter.

4. An apparatus according to claim 1, wherein said signal corrector includes a multiple order digital filter having an input, an output, and an output attenuation characteristic being a function of frequency, said output attenuation characteristic being substantially complementary to said attenuation characteristic of said signal delay, whereby said amplitude of said corrected composite signal is substantially constant as a function of frequency.

5. An apparatus according to claim 1, wherein said time increments are at most as long as said sample period.

6. A method for delaying and combining ultrasound signals from an associated plurality of ultrasound transducers, each of said ultrasound signals being associated with one of a corresponding plurality of signal processing channels, said method comprising:
   A. receipt of each of said ultrasound signals from each of said associated plurality of ultrasound transducers;
   B. conversion of each of said ultrasound signals into a series of digital data elements at a digital sample rate, said digital data elements having a sample period corresponding to said digital sample rate;
   C. selective delay of each of said series of digital data elements by one of a plurality of time increments to produce a delayed signal comprising a series of delayed digital data elements wherein said delayed signal is characterized by an attenuation characteristic being substantially identical for all of said processing channels;
   D. summation of said series of delayed digital data elements form said plurality of processing channels, where contemporaneous samples from each of said processing channels are summed to form a composite signal comprising a series of composite digital data elements; and
   E. correction of said composite signal for one or more distortions introduced by said delay means so as to form a corrected composite signal having an amplitude.

7. A method according to claim 6, wherein said step of selectably delaying each of said series of digital data elements, said method further including:
   i. provision of a signal delay having an input, an output, and a delay characteristic from said input to said output, said delay characteristic being a function of a plurality of dynamically selectable control coefficients defining a plurality of delays, wherein said attenuation characteristic of said signal delay is substantially identical for all of said plurality of signal processing channels;
   ii. the setting of said control coefficients to a predetermined state; and,
   iii. the passing of said series of digital data elements through said signal delay.

8. A method according to claim 7, wherein said signal delay includes a multiple order digital filter.

9. A method according to claim 6, wherein said step of correction of said composite signal further includes:
   i. the provision of a multiple order digital filter having an input, an output, and an output attenuation characteristic being a function of frequency, said first attenuation characteristic being substantially complementary to said attenuation characteristic of said signal delay, whereby said amplitude of said corrected composite signal is substantially constant as a function of frequency; and,
   ii. the passing of said series of digital data elements through said multiple order digital filter.

10. An apparatus according to claim 2, said signal delay having a dynamic range sufficient to substantially eliminate a quantization error due to said attenuation characteristics.

* * * * *